(12) United States Patent
Cho et al.

(10) Patent No.: US 11,543,490 B2
(45) Date of Patent: Jan. 3, 2023

(54) METHOD AND APPARATUS FOR MEASURING DISTANCE BY MEANS OF RADAR

(71) Applicant: WRT LAB CO., LTD., Seoul (KR)

(72) Inventors: Sung Ho Cho, Seoul (KR); Sung Won Yoo, Seoul (KR); Han Na Ryu, Incheon (KR)

(73) Assignee: WRT LAB CO., LTD., Seoul (KR)

( * ) Notice: Subject to any disclaimer, the term of this patent is extended or adjusted under 35 U.S.C. 154(b) by 740 days.

(21) Appl. No.: 16/480,085

(22) PCT Filed: Jan. 25, 2018

(86) PCT No.: PCT/KR2018/001138
§ 371 (c)(1),
(2) Date: Jul. 23, 2019

(87) PCT Pub. No.: WO2018/139882
PCT Pub. Date: Aug. 2, 2018

(65) Prior Publication Data
US 2020/0011971 A1     Jan. 9, 2020

(30) Foreign Application Priority Data

Jan. 26, 2017   (KR) .................. 10-2017-0012498

(51) Int. Cl.
*G01S 7/41*     (2006.01)
*G01S 13/08*    (2006.01)
(Continued)

(52) U.S. Cl.
CPC .............. *G01S 7/412* (2013.01); *G01S 7/417* (2013.01); *G01S 13/08* (2013.01); *G06N 3/04* (2013.01); *G06N 3/08* (2013.01)

(58) Field of Classification Search
CPC .......... G01S 13/08; G01S 7/412; G01S 7/417; G06N 20/10; G06N 3/04; G06N 3/08
See application file for complete search history.

(56) References Cited

U.S. PATENT DOCUMENTS 9,229,102 B1 * 1/2016 Wright ................. G01S 13/885
2007/0188169 A1   8/2007 Mahler et al.
(Continued)

FOREIGN PATENT DOCUMENTS

JP      H05-272291 A    10/1993
JP      2008-051550 A    3/2008
(Continued)

OTHER PUBLICATIONS

International Search Report issued in PCT/KR2018/001138, dated Apr. 30, 2018.

*Primary Examiner* — Timothy X Pham
(74) *Attorney, Agent, or Firm* — Locke Lord LLP; Scott D. Wofsy; Michael J. Pollack

(57) ABSTRACT

Disclosed is a method and apparatus for measuring a distance to a target object by using a radar signal in an environment where an obstacle is present. The disclosed method of measuring a distance by using a radar includes: receiving a radar signal reflected from a target object by passing through a target obstacle; estimating material of the target obstacle by using an obstacle material learning result which uses a waveform of a reference radar signal, and by using a waveform of the reflected radar signal; estimating a thickness of the target obstacle by using an obstacle thickness learning result which uses a frequency feature of the reference radar signal, and by using a frequency feature of the reflected radar signal; and calculating a distance to the target object by using a permittivity according to the material of the target obstacle, and the thickness of the target obstacle.

10 Claims, 6 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 2012/0235849 A1* | 9/2012 | Tatoian | G01S 13/888 342/21 |
| 2016/0234653 A1* | 8/2016 | Chu | G01S 5/14 |
| 2017/0211963 A1* | 7/2017 | Taheri | G01S 7/03 |

FOREIGN PATENT DOCUMENTS

| | | |
|---|---|---|
| KR | 10-1440085 | 9/2014 |
| KR | 10-2015-0143154 A | 12/2015 |
| KR | 10-2016-0137267 A | 11/2016 |

\* cited by examiner wood(plywood)

insulation brick gypsum board

METHOD AND APPARATUS FOR MEASURING DISTANCE BY MEANS OF RADAR

CROSS REFERENCE TO RELATED APPLICATIONS

This application is a U.S. National Phase Application filed under 35 U.S.C. § 371, based on Application PCT/KR2018/001138, filed Jan. 25, 2018, which application claims priority to Korean Patent Application No. 10-2017-0012498 filed on Jan. 26, 2017. The entire contents of these applications are incorporated herein by reference in their entirety.

TECHNICAL FIELD

The present invention relates to a method and apparatus for measuring a distance by using a radar. More particularly, the present invention relates to a method and apparatus for accurately measuring a distance in an environment where an obstacle is present.

BACKGROUND ART

Generally, conventional radio frequency (RF) signal based obstacle transmission studies are based on a damping ratio of received signals. The above method is a method of estimating a permittivity and a thickness of an obstacle by using an energy difference between an energy when a signal transmitted from a transmitter is received by passing through an environment where an obstacle is present, and an energy when a signal is transmitted in vacuum, and time information of how long the signal has been delayed and received is required. In addition, in the through-wall imaging field, which has been actively studied recently, an array antenna is used to overcome effects of obstacles by processing signals received from each antenna.

Accordingly, recently, research is underway to detect targets in an environment where an obstacle is present by using radar signals.

In conventional researches of obstacle transmission techniques using a radar signal, a feature of the obstacle is provided or a distance to a target object is provided. In a general communication system where information is exchanged between a transmitter and a receiver, information of how long a signal is delayed is provided, and the feature of the obstacle is classified. Accordingly, the entire system has to be large and a damping modeling has to be accurate. A method of using an array antenna consumes a great deal of money in constituting the system, and processing received signals.

DISCLOSURE

Technical Problem

The present invention is to provide a method and apparatus for accurately measuring a distance to a target object in an environment where an obstacle is present by using a radar signal.

In addition, the present invention is to provide a method of estimating a feature of an obstacle by using machine learning.

Technical Solution

Accordingly, the present invention has been made keeping in mind the above problems occurring in the prior art, according to an embodiment of the present invention, there is provided a method of measuring a distance by using a radar, the method including: receiving a radar signal reflected from a target object by passing through a target obstacle; estimating material of the target obstacle by using an obstacle material learning result which uses a waveform of a reference radar signal, and by using a waveform of the reflected radar signal; estimating a thickness of the target obstacle by using an obstacle thickness learning result which uses a frequency feature of the reference radar signal, and by using a frequency feature of the reflected radar signal; and calculating a distance to the target object by using a permittivity according to the material of the target obstacle, and by using the thickness of the target obstacle.

According to another embodiment of the present invention, there is provided a method of measuring a distance by using a radar, the method including: receiving a radar signal reflected from a target object by passing through a target obstacle; estimating a permittivity of the target obstacle by using an obstacle permittivity learning result which uses a waveform of a reference radar signal, and by using a waveform of the reflected radar signal; estimating a thickness of the target obstacle by using an obstacle thickness learning result which uses a frequency feature of the reference radar signal, and by using a frequency feature of the reflected radar signal; and calculating a distance to the target object by using the permittivity and the thickness of the target obstacle According to still another embodiment of the present invention, there is provided a method of performing learning, wherein the learning method is for measuring a distance by using a radar, the method including: receiving waveform information of a radar signal received by passing through an obstacle, and material information of the obstacle; performing obstacle material learning for the waveform; receiving frequency feature information of the radar signal, and thickness information of the obstacle; and performing obstacle thickness learning for the frequency feature.

Advantageous Effects

According to the present invention, a feature of an obstacle through which a radar signal passes can be analyzed, a distance to a target object can be calculated by reflecting the analysis result, and thus a distance to a target object can be accurately calculated.

In addition, according to the present invention, material and a thickness of an obstacle are estimated by using material and thickness learning results according to machine learning, and thus the material and the thickness of the obstacle can be accurately estimated.

MODE FOR INVENTION

Since the present invention may be modified in various forms and may have various embodiments, the following exemplary embodiments are illustrated in the accompanying drawings, and are described in detail with reference to the drawings. However, this is not intended to limit the present invention to specific embodiments, and the present invention should be construed to encompass various changes, equivalents, and substitutions within the technical scope and spirit of the invention. Like numbers refer to like elements throughout in the description of each drawing.

Hereinafter, various embodiments of the present invention will be described with reference to the accompanying drawings.

Figure 1:
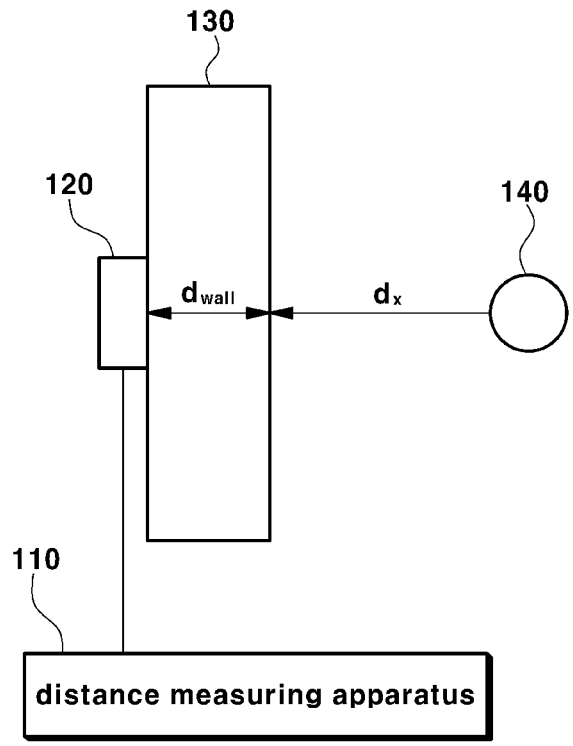
FIG. 1 is a view showing a distance measuring system using a radar according to an embodiment of the present invention.

FIG. 1 is a view showing a distance measuring system using a radar according to an embodiment of the present invention.

Referring to FIG. 1, a distance measuring system according to the present invention includes a distance measuring apparatus 110 and a radar signal transmitting and receiving unit 120. According to an embodiment, the radar signal transmitting and receiving unit 120 may be included in the distance measuring apparatus 110.

The radar signal transmitting and receiving unit 120 transmits a radar signal to a target object 140 that is a distance measuring target, and receives a radar signal that is reflected from the target object 140 and passes through a target obstacle 130. In an embodiment, the radar signal may be an impulse response ultra wide band (IR-UWB) radar signal.

The distance measuring apparatus 110 analyzes a feature of the target obstacle 130 by using a single radar signal received by being reflected from the target object 140, and calculates a distance from the radar signal transmitting and receiving unit 120 to the target object 140 by reflecting the analysis result. Herein, in an embodiment, the feature of the target obstacle 130 is a permittivity and a thickness. The radar signal represents different damping features and transmission loss features according to a medium, that is, a permittivity and a thickness of an obstacle, and the distance measuring apparatus 110 may calculate an accurate distance by calculating a distance to a target object according to a permittivity and a thickness of the target obstacle 130.

The distance measuring apparatus 110 uses a machine learning result to estimate a permittivity and a thickness of the target obstacle 130.

The distance measuring apparatus 110 estimates material of the target obstacle 130 by using an obstacle material learning result which uses a waveform of a reference radar signal for learning, and by using a waveform of a radar signal reflected from the target object 140. In addition, the thickness of the target obstacle 130 is estimated by using an obstacle thickness learning result which uses a frequency feature of the reference radar signal, and by using a frequency feature of the reflected radar signal.

As a permittivity is predetermined for each material, when material of a target obstacle is estimated, a permittivity of the estimated material of the target obstacle may be estimated. Alternatively, according to an embodiment, the distance measuring apparatus 110 may estimate a permittivity of the target obstacle 130 by using an obstacle permittivity learning result of which uses a waveform of a reference radar signal for learning, and by using a waveform of a radar signal reflected from the target object 140.

The distance measuring apparatus 110 measures a first distance to the measured target object 140 by using a velocity of a reflected radar signal and a receiving time of the reflected radar signal, and finally calculates a distance to the target object from the measured first distance by using the permittivity of the target obstacle 130 and compensating an error according to the thickness.

The distance measuring apparatus 110 may calculate the first distance by using a ToA algorithm, and may calculate a second distance to the target object 140 by reflecting an error compensation value according to the permittivity and the thickness of the target obstacle 130 in the first distance.

As a result, according to the present invention, a feature of an obstacle through which a radar signal passes, and a distance to a target object are calculated by reflecting an analysis result. Thus, a distance to the target object may be accurately calculated.

In addition, according to the present invention, material and a thickness of an obstacle are estimated by using material and thickness learning results according to machine learning, and thus material and the thickness of the obstacle can be accurately estimated.

Figure 2:
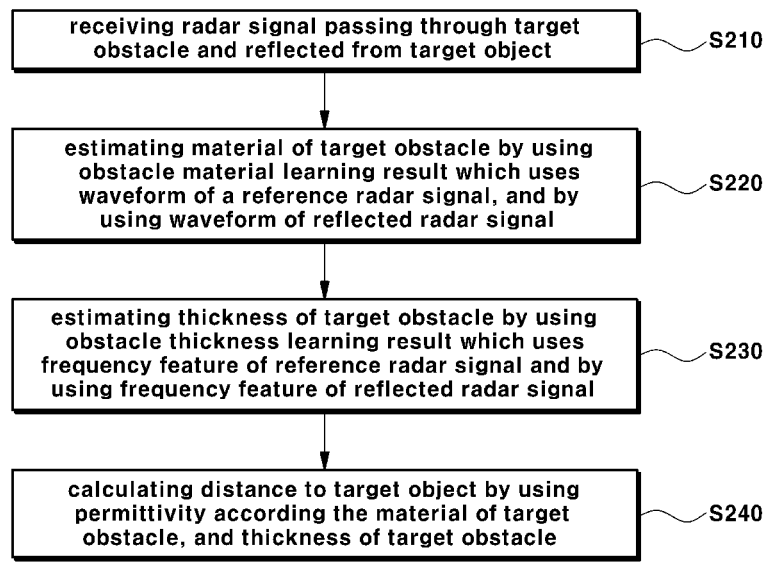
FIG. 2 is a view showing a distance measuring method using a radar according to an embodiment of the present invention.
Figure 3:
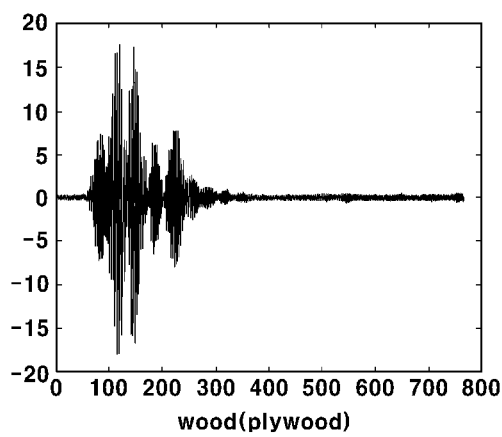
FIG. 3 is a view showing a waveform of a radar signal according to material of an obstacle.
Figure 3:
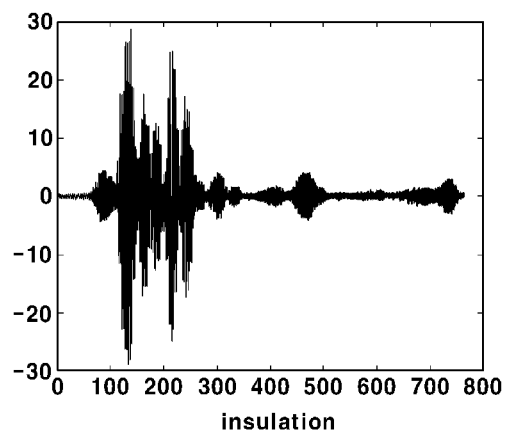
Figure 3:
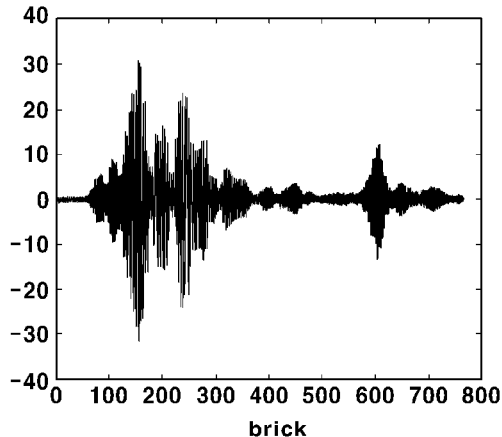
Figure 3:
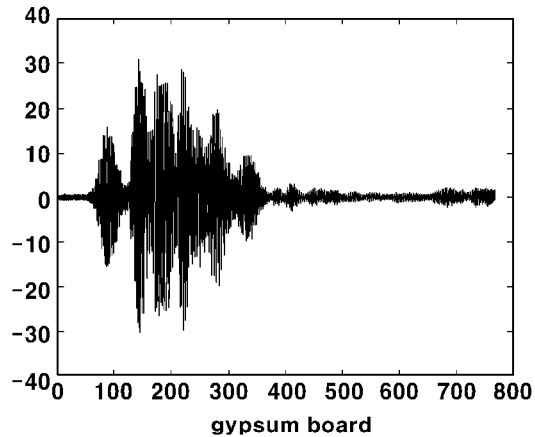
Figure 4:
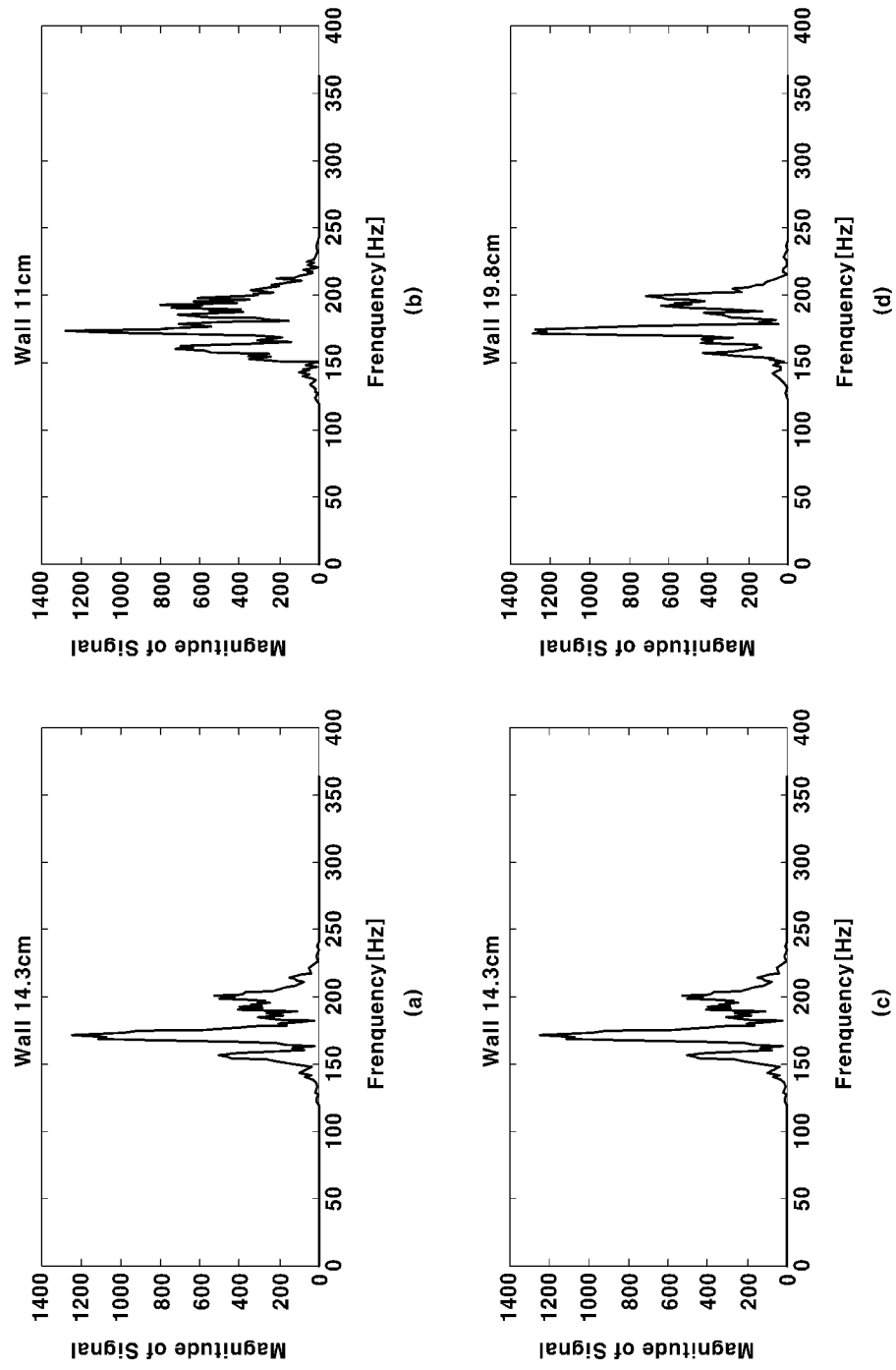
FIG. 4 is a view showing a frequency component of a radar signal according to a thickness of an obstacle.

FIG. 2 is a view showing a distance measuring method using a radar according to an embodiment of the present invention. FIG. 3 is a view showing a waveform of a radar signal according to material of an obstacle, and FIG. 4 is a view showing a frequency component of a radar signal according to a thickness of an obstacle. A distance measuring method according to the present invention may be performed in the above-described distance measuring apparatus or in a computing apparatus including a processor, and in FIG. 2, and a distance measuring method of the above-described distance measuring apparatus will be described as an embodiment.

In S210, the distance measuring apparatus according to the present invention receives a radar signal that passes through a target obstacle and reflected from a target object. As described above, the radar signal transmitting and receiving unit transmits and receives a radar signal, and the received radar signal may be provided to the distance measuring apparatus.

In S220, the distance measuring apparatus estimates material of a target obstacle by using an obstacle material learning result which uses a waveform of a reference radar signal, and by using a waveform of the reflected radar signal. Subsequently, in S230, the distance measuring apparatus estimates a thickness of the target obstacle by using an obstacle thickness learning result which uses a frequency feature of the reference radar signal, and by using a frequency feature of the reflected radar signal.

As shown in FIG. 3, a waveform of a reflected radar signal varies according to an obstacle material, material of a target obstacle may be estimated from a waveform of a radar signal reflected from the target object by using a learning result when learning is respectively performed for waveforms of other obstacles having different materials, and for a waveform of a radar signal of each obstacle.

In an example, the distance measuring apparatus may estimate that a target obstacle is a brick obstacle when a waveform of a radar signal reflected from a target object is similar to a waveform of a radar signal received by passing through a brick obstacle of FIG. 3.

Learning for a material permittivity may be performed for an envelope of a reference data signal. Herein, the distance measuring apparatus may estimate material of a target obstacle by using an envelope of a reflected radar signal.

In addition, as shown in FIG. 4, a frequency feature of a reflected radar signal varies according to an obstacle thickness of, a thickness of a target obstacle may be estimated from a frequency feature of the radar signal reflected from the target object by using a learning result when learning is respectively performed for frequency features of other obstacles having different thickness, and for a frequency feature of a radar signal of each obstacle.

In an example, the distance measuring apparatus may estimate that a thickness of a target obstacle is 11 cm when a frequency feature of a radar signal reflected from the target object is similar to a frequency feature of a radar signal that is received by passing through an obstacle (wall) having a thickness of 11 cm shown in FIG. 4(b). The distance measuring apparatus may analyze a frequency feature of a radar signal through fast Fourier transform.

Learning for a thickness of an obstacle may be performed for the highest n (n is natural number) peak values among frequency components of a reference radar signal and for a frequency corresponding to the peak value. Herein, the distance measuring apparatus may estimate a thickness of a target obstacle by using n peak values among frequency components of the reflected radar signal and a frequency corresponding to the peak value.

A frequency feature of an obstacle thickness of varies according to obstacle material, and thus learning may be performed for frequency feature information of thickness different from each other of each obstacle material. In addition, the distance measuring apparatus may estimate a thickness of a target obstacle by using a thickness learning result of the obstacle having the material estimated in S220.

A learning method for material and a thickness of an obstacle will be described in detail with reference to FIG. 5.

Referring again to FIG. 2, in S240, the distance measuring apparatus calculates a distance to the target object by using the permittivity and the thickness according to the material of the target obstacle.

In detail, the distance measuring apparatus calculates a first distance to the target object by using a velocity of the reflected radar signal and a receiving time of the reflected radar signal, and generates an error compensation value according to the permittivity and the thickness of the target obstacle. Subsequently, a second distance to the target object is calculated by reflecting the error compensation value in the first distance.

Referring to FIG. 1, a velocity $v_{wall}$ of a radar signal in the target obstacle 130 may be calculated as [Equation 1], and a first distance $d_{measure}$ may be calculated as [Equation 2] according to a relation between a time, a velocity, and a distance. [Equation 2] may be defined as [Equation 3], and a second distance $d_{real}$ is sum of a thickness $d_{wall}$ of the target obstacle and a distance $d_x$ between the target obstacle and the target object. Thus, the distance measuring apparatus may calculate the second distance by using [Equation 4].

$$v_{wall} = \frac{c}{\sqrt{\varepsilon}} \quad \text{[Equation 1]}$$

$$c\left(\frac{d_{wall}}{v_{wall}} + \frac{d_x}{c}\right) = d_{measure} \quad \text{[Equation 2]}$$

$$d_x = d_{measure} - d_{wall}\sqrt{\varepsilon} \quad \text{[Equation 3]}$$

$$d_{real} = d_{measure} + (1 - \sqrt{\varepsilon})d_{wall} \quad \text{[Equation 4]}$$

Herein, c represents a velocity of light, and ε represents a permittivity of a target obstacle.

In [Equation 4], $$(1-\sqrt{\varepsilon})d_{wall}$$

corresponds to the above-described error compensation value, and the error compensation value may be determined according to a permittivity and a thickness of a target obstacle.

Meanwhile, according to an embodiment, the distance measuring apparatus may estimate a permittivity of the target obstacle by using an obstacle permittivity learning result which uses a waveform of a reference radar signal, and by using a waveform of the reflected radar signal.

Figure 5:
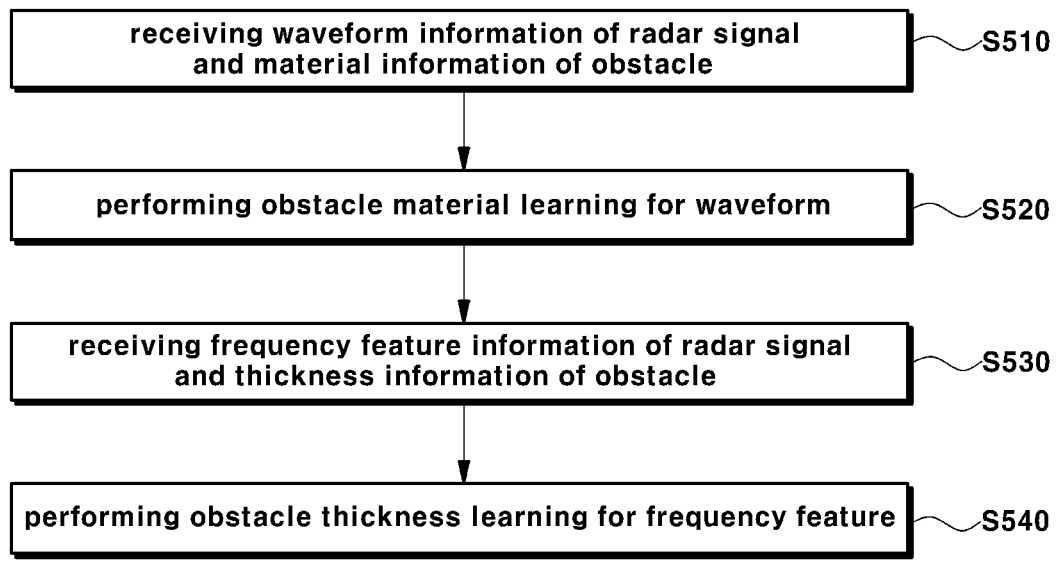
FIG. 5 is a view showing a learning method for measuring a distance by using a radar according to an embodiment of the present invention.
Figure 6:
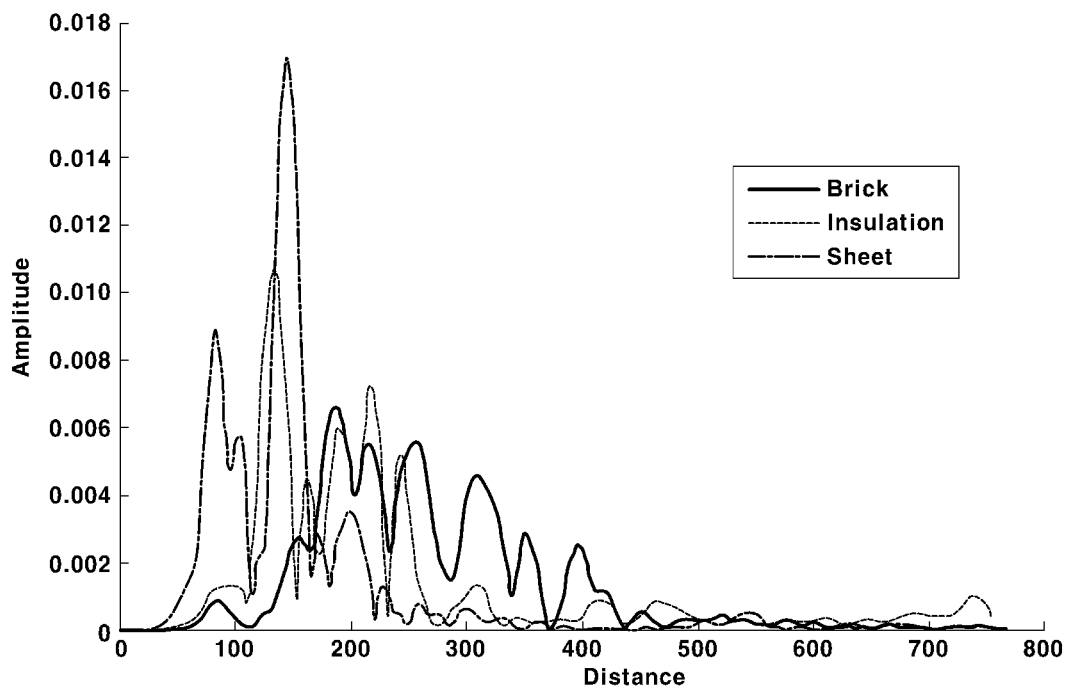
FIG. 6 is a view showing an envelope of a reference radar signal used for learning.
Figure 7:
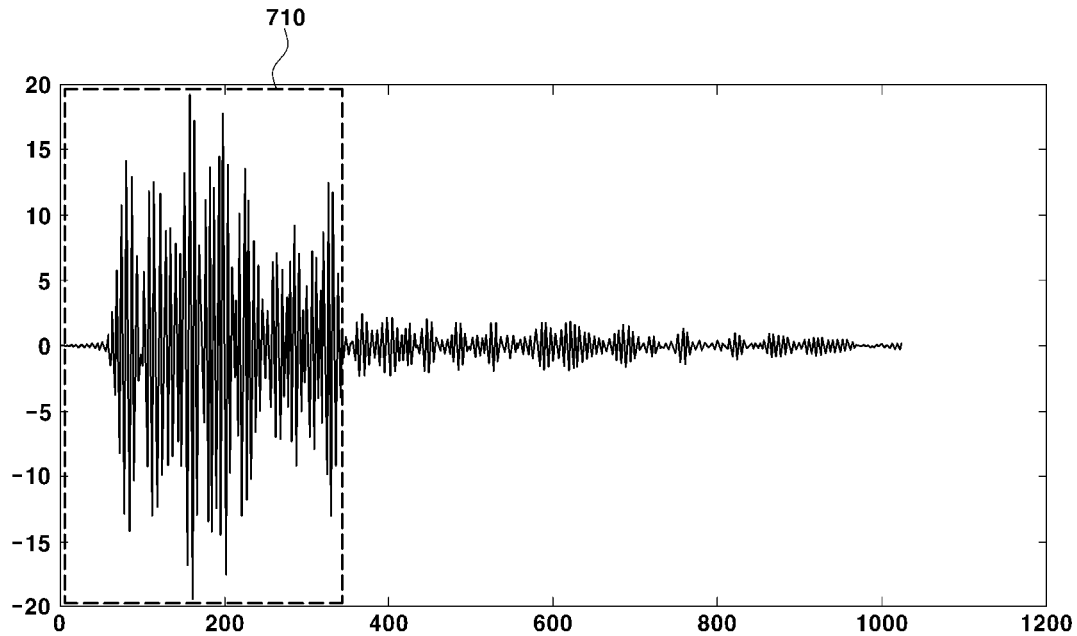
FIG. 7 is a view showing an area where a frequency component is extracted in a radar signal.

FIG. 5 is a view showing a learning method for measuring a distance by using a radar according to an embodiment of the present invention. FIG. 6 is a view showing an envelope of a reference radar signal used for learning, and FIG. 7 is a view showing an area where a frequency component is extracted in a radar signal.

A learning method according to the present invention may be performed in the above-described distance measuring apparatus or in a computing apparatus including a processor. When learning is performed in an additional learning apparatus, a learning result of the learning may be provided to the distance measuring apparatus. In FIG. 5, an example will be described where a learning method is performed in a learning apparatus.

In S510, a learning apparatus according to the present invention receives waveform information of a radar signal received by passing through an obstacle, and material information of the obstacle, and in S520, performs obstacle material learning for a waveform of the radar signal. Subsequently, in S530, the learning apparatus receives frequency feature information of the radar signal and thickness information of the obstacle, and in S504, performs obstacle thickness learning for a frequency feature of the radar signal. A learning result may be stored in a database, and the distance measuring apparatus may estimate material and a thickness of the target obstacle by using the learning result stored in the database.

Herein, the radar signal is a radar signal for learning data, that is, the above-described learning, and may corresponds to the above-described reference signal. A number of radar signals for learning may vary according to an embodiment.

In S510, an embodiment of waveform information of a radar signal may be envelope information of a radar signal. A signal waveform varies according to material of an obstacle (brick, insulation, sheet), and thus an envelope may also vary as shown in FIG. 6. FIG. 6 shows an envelope of a radar signal for a brick having a thickness of 110 mm, an insulation, and a sheet. When learning is performed through an envelope of a radar signal, the distance measuring apparatus may estimate material of a target obstacle by using the envelope of a radar signal reflected from the target object. In an example, an envelope may be obtained through Hilbert transform.

In S520, frequency feature information may include the highest n peak values among frequency components of a radar signal, and a frequency corresponding to a peak value. When learning is performed through the highest n peak values among frequency components of a radar signal, and a frequency corresponding to a peak value, the distance measuring apparatus may estimate a thickness of a target obstacle by using highest n peak values among frequency components of a radar signal reflected from the target object, and a frequency corresponding to a peak value.

Meanwhile, unnecessary resource waste may occur when the entire radar signal is converted into a frequency domain, and thus the learning apparatus may perform learning for frequency feature information of a preset analysis area of the radar signal. As shown in FIG. 7, a frequency component of a specific analysis area 710 including a specific range on the basis of an X axis, that is a time, and including the entire Y axis, that is a magnitude, may be analyzed, and the result may be used for learning.

The analysis area may be set to an arbitrary area according to an embodiment or may be determined according to an obstacle. The analysis area 710 of FIG. 7 is an area including a waveform generated due to an obstacle, and represents an analysis area determined according to an obstacle. Referring to FIG. 3, generally, a specific waveform pattern due to an obstacle is generated before the mid-point based on an X axis, and thus an analysis are may be determined by taking into account of a point at which such a specific waveform due to an obstacle is generated.

A section where a specific waveform pattern is maintained differs for each obstacle, and thus an analysis are may be set relatively wide, and when a frequency component is analyzed from a reflected radar signal for distance measuring, the analysis area may be set to be associated with an analysis area used for learning.

Meanwhile, according to an example, the learning apparatus receives waveform information of a radar signal that is received by passing through an obstacle, and permittivity information of the obstacle, and performs obstacle permittivity learning for the waveform of the radar signal.

Figure 8:
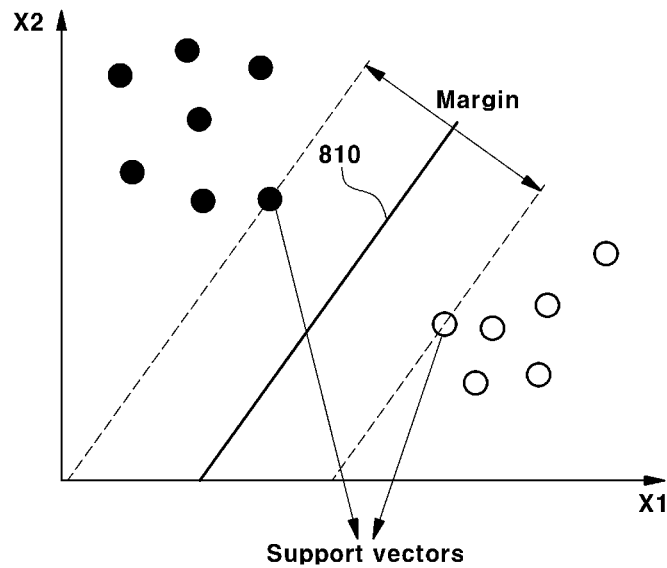
FIG. 8 is a view showing a support vector machine (SVM) algorithm.
Figure 9:
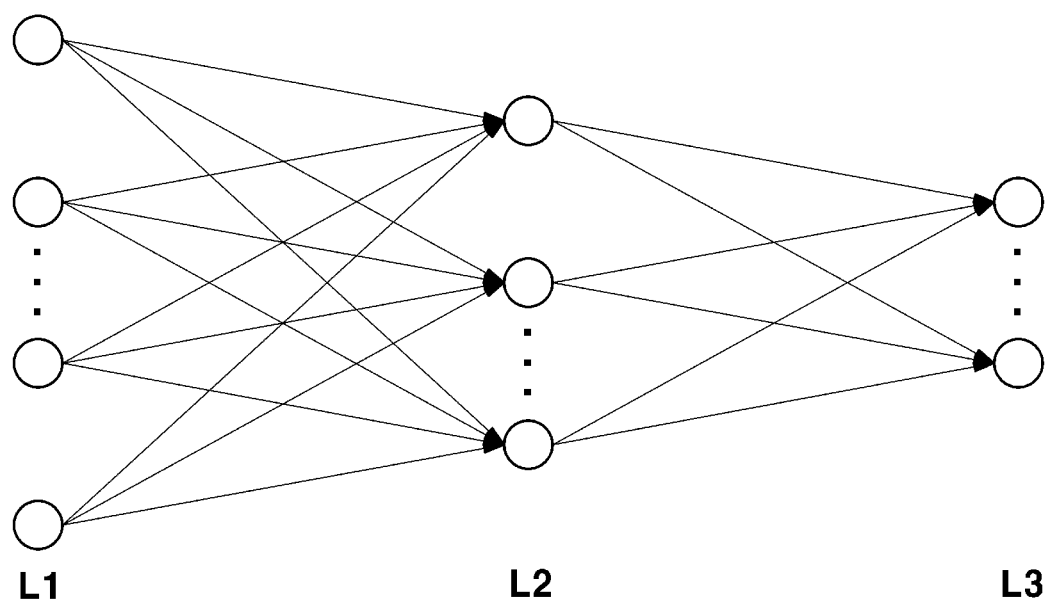
FIG. 9 is a view showing an artificial neural network.

FIG. 8 is a view showing an SVM algorithm, and FIG. 9 is a view showing an artificial neural network.

In an embodiment, the learning apparatus according to the present invention may perform obstacle material learning for a waveform of a radar signal by using an SVM algorithm. Alternatively, in an embodiment, the learning apparatus may perform obstacle thickness learning for a waveform of a radar signal by using an artificial neural network.

Referring to FIG. 8, SVM is an algorithm that determines data positioned at the outermost among a plurality of data as support vector, and classifying data by classes different from each other through a hyperplane 810 passing between the support vectors. Herein, the hyperplane 810 may be determined such that a margin between the hyperplane 810 and the support vectors becomes maximum.

Through learning, the hyperplane 810 may be determined where a waveform of a radar signal for each material of an obstacle is classified into classes different from each other, and to which class a waveform of a radar signal input after the learning belongs may be determined. The class may be classified by obstacle material.

Referring to FIG. 9, an artificial neural network may be configured with an input layer L1, a hidden layer L2, and an output layer L3. The artificial neural network is a technique widely used in deep learning recently, wherein a weight factor of a connection line connecting nodes is adjusted in a training mode, and a classification result for an input value is output in a classification mode.

In the training mode, learning is performed by using frequency feature information of a reference radar signal and thickness information of an obstacle. In the classification mode, when frequency feature information of a reflected radar signal is received from a target object, an obstacle thickness is output.

A number of hidden layers and a number of nodes of hidden layers may be variably set according to an artificial neural network algorithm, and a node of the output layer may be determined according to a value that is finally classified.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although the present invention has been described in terms of specific items such as detailed components as well as the limited embodiments and the drawings, they are only provided to help general understanding of the invention, and the present invention is not limited to the above embodiments. It will be appreciated by those skilled in the art that various modifications and changes may be made from the above description. Therefore, the spirit of the present invention shall not be limited to the above-described embodiments, and the entire scope of the appended claims and their equivalents will fall within the scope and spirit of the invention.

The invention claimed is:

1. A method of measuring a distance by using a radar, the method comprising:
   receiving a radar signal reflected from a target object by passing through a target obstacle;
   estimating material of the target obstacle by using an obstacle material learning result which uses a waveform of a reference radar signal, and by using a waveform of the reflected radar signal;
   estimating a thickness of the target obstacle by using an obstacle thickness learning result which uses a frequency feature of the reference radar signal, and by using a frequency feature of the reflected radar signal; and
   calculating a distance to the target object by using a permittivity according to the material of the target obstacle, and by using the thickness of the target obstacle, wherein the calculating of the distance to the target object includes:
calculating a first distance to the target object by using a velocity of the reflected radar signal and a receiving time of the reflected radar signal;
generating an error compensation value according to the permittivity and the thickness of the target obstacle; and
calculating a second distance to the target object by reflecting the error compensation value in the first distance.

2. The method of claim 1, wherein the obstacle material learning result is a learning result of an envelope of the reference radar signal, and in the estimating of the material of the target obstacle, the material is estimated by using the envelope of the reflected radar signal.

3. The method of claim 1, wherein the obstacle thickness learning result is a learning result of highest n (n is a natural number) peak values among frequency components of the reference radar signal and a frequency corresponding to the peak value, and in the estimating of the thickness of the target obstacle, the thickness is estimated by using the n peak values among frequency components of the reference radar signal and the frequency corresponding to the peak value.

4. A method of performing learning, wherein the learning method is for measuring a distance by using a radar, the method comprising:
receiving waveform information of a radar signal received by passing through an obstacle, and material information of the obstacle;
performing obstacle material learning for the waveform;
receiving frequency feature information of the radar signal, and thickness information of the obstacle;
performing obstacle thickness learning for the frequency feature; and
calculating a distance to the target object by using a permittivity according to the material of the target obstacle, and by using the thickness of the target obstacle,
wherein the calculating of the distance to the target object includes:
calculating a first distance to the target object by using a velocity of the reflected radar signal and a receiving time of the reflected radar signal;
generating an error compensation value according to the permittivity and the thickness of the target obstacle; and
calculating a second distance to the target object by reflecting the error compensation value in the first distance.

5. The method of claim 4, wherein the waveform information is envelope information of the radar signal.

6. The method of claim 4, wherein in the performing of the obstacle material learning, the obstacle material learning is performed by using a support vector machine algorithm.

7. The method of claim 4, wherein the frequency feature information includes highest n (n is a natural number) peak values and a frequency corresponding to the peak value.

8. The method of claim 4, wherein the performing of the obstacle thickness learning, the obstacle thickness learning is performed by using an artificial neural network.

9. The method of claim 4, wherein the frequency feature information is frequency feature information of a preset analysis area of the radar signal, wherein the analysis area is determined according to the obstacle.

10. A method of measuring a distance by using a radar, the method comprising:
receiving a radar signal reflected from a target object by passing through a target obstacle;
estimating a permittivity of the target obstacle by using an obstacle permittivity learning result which uses a waveform of a reference radar signal, and by using a waveform of the reflected radar signal;
estimating a thickness of the target obstacle by using an obstacle thickness learning result which uses a frequency feature of the reference radar signal, and by using a frequency feature of the reflected radar signal; and
calculating a distance to the target object by using the permittivity and the thickness of the target obstacle,
wherein the calculating of the distance to the target object includes:
calculating a first distance to the target object by using a velocity of the reflected radar signal and a receiving time of the reflected radar signal;
generating an error compensation value according to the permittivity and the thickness of the target obstacle; and
calculating a second distance to the target object by reflecting the error compensation value in the first distance.

* * * * *